Dec. 18, 1951     W. R. PAUL     2,579,048
AUTOMATIC PRESSURE CONTROL
SYSTEM FOR PNEUMATIC TIRES

Filed Jan. 19, 1950     2 SHEETS—SHEET 1

INVENTOR
William R. Paul.
BY Herbert M. Birch
ATTORNEY

Dec. 18, 1951     W. R. PAUL     2,579,048
AUTOMATIC PRESSURE CONTROL
SYSTEM FOR PNEUMATIC TIRES
Filed Jan. 19, 1950     2 SHEETS—SHEET 2
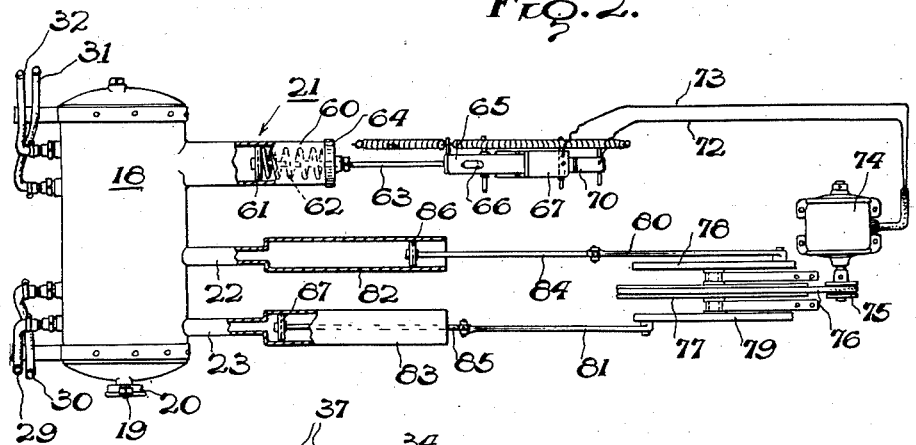
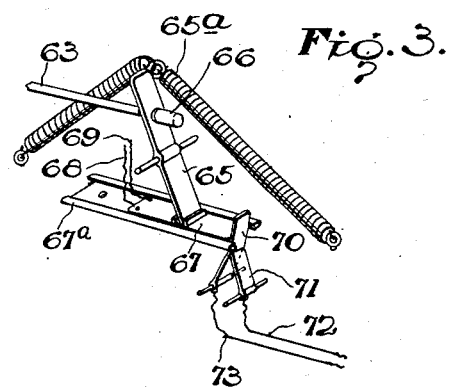
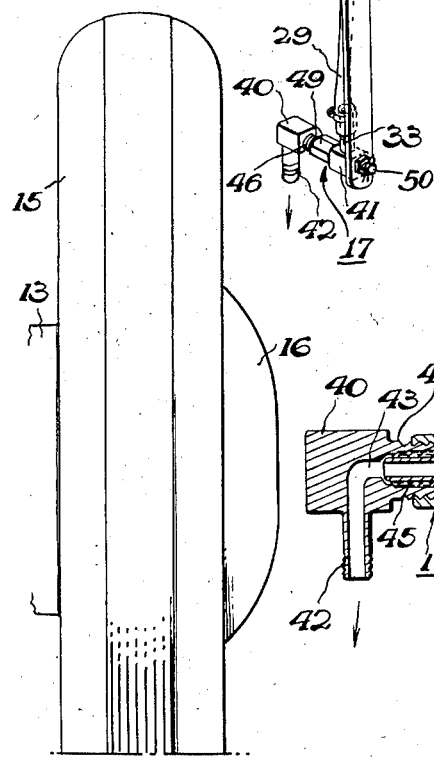
INVENTOR
William R. Paul.
BY Herbert M. Birch
ATTORNEY Patented Dec. 18, 1951

2,579,048

UNITED STATES PATENT OFFICE 2,579,048

AUTOMATIC PRESSURE CONTROL SYSTEM FOR PNEUMATIC TIRES

William R. Paul, Amarillo, Tex.

Application January 19, 1950, Serial No. 139,375

4 Claims. (Cl. 152—416)

My present invention relates to pneumatic tires and particularly to means for automatically controlling the pressure of such tires during use.

The importance of maintaining the proper dynamic balance of the tire and inner tube assembly for each wheel within certain limits specified by the manufacturers is well known. When a tire is out of balance uneven wear, "shimmy" or "tramp" results. One of the chief causes of such conditions may be non-uniform inflation. Non-uniform inflation usually develops while the vehicle is traveling either from slow leaks or from heat conditions and the operator may drive many miles before he realizes such a condition exists. Thus there has long been needed some accurate automatic means for maintaining tire pressures uniformly constant during the driving of pneumatic tire vehicles over the road or highway to protect the tires from either over or under inflation.

It is an object of my invention to provide a novel system, whereby during driving the pneumatic tires are kept at substantially the proper inflated pressures.

Another object is to provide in an automatic tire inflation system, an air reservoir connecting with each tire including a condition responsive means for maintaining a proper pressure in the reservoir and the tires at all times.

Another object is to provide an air reservoir, a pressure responsive electric switch and an electrically driven air pump for maintaining pressures in the air reservoir within proper limits to maintain the pressure of each tire within the proper safe driving limits, to thereby avoid over or under inflation from leaks or excessive tire temperatures developed on the road.

A further object is to provide novel connections for each wheel, whereby air from the reservoir tank is free to pass into the tire tube through the conventional tire valve stem during driving on road.

Still a further object is to provide for changing tires when necessary by having connections demountable with the hub caps of the wheels.

Other objects and many advantages will appear from the following detailed description of one embodiment of my invention and the appended claims.

In the drawings wherein the several parts are each given a numeral and referred to throughout the description by such numerals:

Figure 2 is an enlarged view of the air reservoir and its connections including the condition responsive means and the pump mechanism;

Figure 3 is a detail view in perspective of the condition responsive pump actuating switch;

Figure 4 is a cross section view of one of the swivel air tube connections and wheel hub cap detached;

Figure 5 is a front perspective view of the mechanism of Figure 4, with the added illustration of one of the air tube wheel arches supported on the chassis side of the fixed part of the brake drum.

Figure 1:
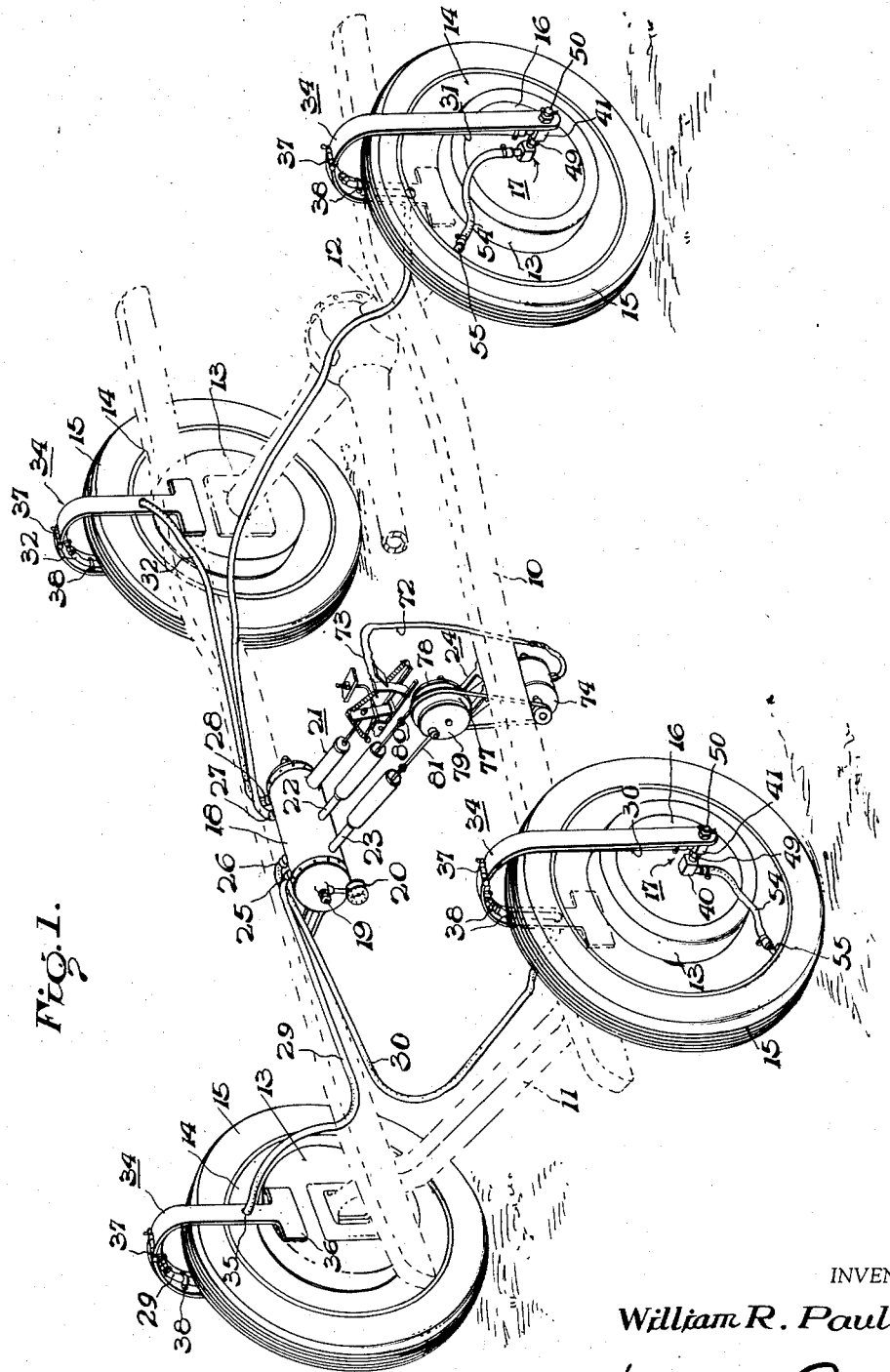
Figure 1 is a semi-diagrammatic illustration of the assembled parts applied to the chassis and rubber tired wheels of a vehicle, the body being removed to clearly show my invention.

Referring to the drawings and first with particular reference to the assembled view of Figure 1, there is illustrated a vehicle chassis 10 with the usual axles 11 and 12, brake drums 13, wheels 14 and pneumatic tires 15. Each wheel mounts a hub cap 16 adjacent which is mounted a novel swivel elbow coupling 17 mounted on the end of a curved strap hereinafter described. This coupling 17 is shown in detail in Figures 4 and 5 as hereinafter fully described.

Mounted on the chassis 10 is a tank 18 formed to mount an air blow-off valve 19 and pressure gage 20, a condition responsive means 21, hereinafter described and connections 22 and 23 to a power driven pump ensemble 24.

At an opposite side of the tank 18 are four outlet connections 25, 26, 27 and 28, each being coupled to elongated sections of flexible tubing or the like, 29, 30, 31 and 32 respectively. This tubing leads from each outlet connection to a threaded nipple 33 of a part of the swivel elbow coupling 17, supported in a curved strap or bracket 34, see Figures 1, 4 and 5. Each section of tubing is identically mounted on the underside of the curved strap 34, which is made in twin sections. The curved strap or bracket 34 arches over the uppermost part of the tire under the usual fender or mud guards, not shown. It is formed with an opening 35 above a T-headed base 36, formed from the inner section, welded, riveted or otherwise secured to a fixed or non-rotating part of the brake drum 13, see Figure 1. At the beginning of the bracket's curved top portion is a detachable connection 37. The connection 37 may be of any suitable form to facilitate separating the sections of the strap bracket 34 when the tubing is disconnected from nipple 33 to change a tire or remove a wheel. As shown it may be detached by removing the coupling pin 31a, see Fig. 5.

The curved strap 34 permits the air tubing to pass through opening 35 and curve around the underside of the strap to its connection with the swivel coupling's threaded nipple 33. The tubing is secured to the strap 34 by clips 38 on the underside of the hinged curved top part.

Swivel elbow coupling 17

The swivel elbow coupling 17 comprises a pair of aligned cubiform blocks 40 and 41 formed with hollow air tube coupling nipples, one of which is 33 and the other 42. These nipples connect with each other by hollow aligned bores 43 and 44. The bore 44 is formed in a hollow extension or third nipple 45, which fits within a relatively larger bore of a threaded coupling or fourth nipple 46 formed from cubiform block 40. The base of the third nipple 45 may be encircled by a split ring 47, which heads some form of packing, such as graphite, cotton or the like, and further serves to coact with the flange 48 of a packing nut 49. Thus arranged the cubiform block 40 may turn freely with respect to the cubiform block 41. The block 41 is formed with an axially extending pin 50 that is welded into a socket 51 in the free end of the strap 34 adjacent the center of hub cap 16.

From the nipple 42 of the elbow swivel coupling 17 there is a section of air tubing 54. There are four such tube sections, one for each tire, and they connect to the usual tire valve stem 55 to supply air to the tires 15 from the air reservoir tank 18. Preferably the usual valve inside the stem is removed so that the tank 18 and air tubing connect direct to the tube interior, and the tank serves the function of a master or servo-device.

Air reservoir tank 18

The tank 18 connects with the several tires from outlet couplings 25, 26, 27 and 28 by air tubes 29, 30, 31 and 32 supported over the tires by the brake drum mounted curved straps 34.

Pressure in the air tank 18 is maintained substantially constant at a predetermined value by means of a pressure release valve 19 and gage 20, a condition responsive means 21 and a pair of piston pumps connected to tank intake tubes 22 and 23. The condition responsive means, see Fig. 2, comprises a cylinder 60 open to the interior of the tank 18. The cylinder 60 houses a piston 61 and a spring 62 coiled around a shaft 63 carrying the piston. The piston shaft 63 extends through a cap 64 over the end of the cylinder through a snap action switch actuating rock bar 65 to a headed ball joint connection 66. The rock bar 65 is hinged to a sliding make and break bar 67. This bar 67 is mounted on a guide track 67ᵃ. One end of the bar 67 connects by leads 68 and 69 to a source of electric current, such as the battery in the vehicle and the other end strikes against an arm 70 of a forked electrical connection 71. From each tine of the connection 71 are electric cables 72 and 73 to an electric motor 74. Snap action of the rock bar 65 is provided by the spring 65ᵃ stretched over the end of the bar. The electric motor 74 has a drive pulley 75, which through belt 76 drives a relatively large pulley 77 on either side of which are eccentric discs 78 and 79.

When the motor 74 is running it drives these eccentric discs and a pair of connecting rods 80 and 81 connected between the said discs and the end of piston rods 84 and 85. These connecting rods are arranged to alternately be moved with respect to each other thereby through the piston rods 84 and 85 driving the pistons 86 and 87 in cylinders 82 and 83 connected to the inlets 22 and 23 of the tank 18.

Operation

In operation the outlets to the air tubes 29, 30, 31 and 32 are open and maintain a pressure in the tires based on the pressure in the tank 18. The tank pressure in turn is kept within predetermined limits by the pressure responsive means 21, which will operate as a function of temperature and/or pressure and the blow-off valve 19.

When the pressure drops due to leakage the piston 61 is moved toward the tank by the spring 62 and the rock bar 65 snaps off-center to the position shown in Figure 3 to close the switch circuit and start the pump motor 74. The motor drives the pumps by means of the eccentric discs 78 and 79 and their respective connecting rods 80 and 81, until the pressure is again brought up to the required level and the piston 61 snaps the rock bar 65 so it imparts sliding movement to bar 67 back to its original circuit breaking position.

Obviously, if pressure becomes too great from heat causes or the like the valve 19 will bleed off such excess pressures, thereby proportionately reducing pressure in the tubes 29, 30, 31 and 32 and the tires 15.

Thus there is provided a novel automatic system of tire pressure control, which maintains substantially uniform pressures during driving over the road even though there may be some leakage or some excess pressures developed in the tires or the system. This provides for much greater safety and longer life of the tires as they are kept at a proper dynamic balance unless a blowout should occur. Of course the danger of blowouts is greatly reduced by uniform pressure regulation.

Although the present invention is only described and illustrated in detail for one embodiment thereof, it is to be expressly understood that the same is not limited thereto. Various changes may be made in the parts and arrangements thereof, as will now probably appear to others skilled in this art. Reference should be had to the appended claims for a definition of the invention.

What is claimed is:

1. An automatic pressure control system for a wheeled vehicle with pneumatic tires, said vehicle having a master air supply tank mounted thereon, said tank having a plurality of outlets, an air supply conduit connected to each of said outlets, wheel mounted swivel air conduit couplings each connected to one of said air supply conduits for supplying air to the inner tube of the tire on its respective wheel, each coupling having two relatively turnable members formed with air conduit connecting nipples the first nipple serving as an air intake from the outlets of said master air tanks through one of said conduits and the second nipple as an outlet connection to the inner tube, an inlet connection opening into said tank, an air pump connected to said tank by said inlet connection, pressure responsive means controlled by pressure in said tank connected to said master tank, an electric circuit, an electric switch in said circuit actuated to open and closed positions by said pressure responsive means, an electric motor in said switch circuit in driving connection with said air pump, said motor being actuated upon closing said switch circuit, thereby operating said air pump upon reduction in pressure due to leakage or the like, and a blow off valve on the tank for reducing excess pressure developed in the tank from heat exchange conditions or the like.

2. In a system of pneumatic tire pressure control for a wheeled vehicle having a master air supply tank mounted thereon, said tank having a plurality of outlets and a plurality of inlets, a swivel air coupling connected between the tire of each wheel and one of the outlets of said tank, said coupling comprising a fixed part and a rotatable part, a tank pressure responsive means connected to said master tank, an electric switch having a switch arm operated by said pressure responsive means, separate conduits each connected to one of the outlets of said tank at one end thereof, and at the other end to the fixed part of one of said couplings, an electric motor, an electric circuit including said switch and said motor, said switch being operative to open and close said electric circuit, and air pumps connected to the tank inlets driven by said motor when pressure drops in said tank, thereby exhausting said pressure responsive means to complete the motor circuit.

3. The system described in claim 2, wherein the drive connection from the motor to the air pumps comprises alternately movable connecting rods and eccentric disc drive connections therefor.

4. The system described in claim 2, wherein the said switch comprises an off-center snap action switch arm.

WILLIAM R. PAUL.

REFERENCES CITED

The following references are of record in the file of this patent:

UNITED STATES PATENTS

| Number | Name | Date |
|---|---|---|
| 1,165,876 | Heberling | Dec. 28, 1915 |
| 1,855,101 | Daneel | Apr. 19, 1932 |
| 1,915,161 | Jordan | June 20, 1933 |
| 1,988,671 | Stout | Jan. 22, 1935 |
| 2,010,250 | Appelgate | Aug. 6, 1935 |
| 2,168,690 | Uksila | Aug. 8, 1939 |
| 2,213,539 | Wiegand | Sept. 3, 1940 |
| 2,473,502 | Bard | June 21, 1949 |